United States Patent
Hoffman et al.

(10) Patent No.: US 11,775,049 B2
(45) Date of Patent: Oct. 3, 2023

(54) DEVICE ATTACHMENT SYSTEMS AND METHODS TO FACILITATE SENSOR CAPABILITY IN DEVICES

(71) Applicant: FLIR Systems AB, Täby (SE)

(72) Inventors: Anton Hoffman, Bromma (SE); Christian Högstedt, Nacka (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 16/998,939

(22) Filed: Aug. 20, 2020

(65) Prior Publication Data

US 2021/0067663 A1 Mar. 4, 2021

Related U.S. Application Data

(60) Provisional application No. 62/891,836, filed on Aug. 26, 2019.

(51) Int. Cl.
G06F 3/00 (2006.01)

(52) U.S. Cl.
CPC .................. G06F 3/005 (2013.01)

(58) Field of Classification Search
CPC .............. G06F 3/005; H04N 5/2253
See application file for complete search history.

(56) References Cited

U.S. PATENT DOCUMENTS

| | | | | |
|---|---|---|---|---|
| 4,768,311 A * | 9/1988 | Olson | ...................... | A47L 11/00 451/350 |
| 10,178,903 B2 | 1/2019 | Guerdrum et al. | | |
| 2009/0109329 A1 * | 4/2009 | Cummings | ........ | H04N 5/23245 348/374 |
| 2011/0195753 A1 | 8/2011 | Mock et al. | | |
| 2012/0056789 A1 * | 3/2012 | Sohn | ..................... | H04B 1/3888 343/702 |
| 2014/0375186 A1 | 12/2014 | Tarnow et al. | | |
| 2015/0042870 A1 * | 2/2015 | Chan | ..................... | G02B 7/102 348/357 |
| 2015/0163393 A1 | 6/2015 | Kim | | |
| 2016/0316119 A1 * | 10/2016 | Kent | ..................... | G01J 5/0265 |
| 2017/0366215 A1 | 12/2017 | Scott | | |
| 2018/0084881 A1 | 3/2018 | Muench | | |
| 2018/0338069 A1 * | 11/2018 | Hu | ........................ | H04N 5/2252 |

FOREIGN PATENT DOCUMENTS

WO   WO 2018/067688   4/2018

\* cited by examiner

*Primary Examiner* — Nasim N Nirjhar
(74) *Attorney, Agent, or Firm* — Haynes and Boone, LLP

(57) ABSTRACT

Techniques are disclosed for facilitating providing of sensor capability in devices using device attachments. In one example, a sensor device includes an attachment body configured to be disposed along a side of a user device when the sensor device is coupled to the user device. The sensor device further includes an actuator configured to selectively apply a force. The sensor device further includes a connector block coupled to the actuator and configured to selectively extend from or retract into the attachment body in response to the force. The sensor device further includes a connector configured to couple to a connector port of the user device and provide data communication between the sensor device and the user device. The connector is at least partially disposed in the connector block. Related systems and devices are also provided.

18 Claims, 10 Drawing Sheets

DEVICE ATTACHMENT SYSTEMS AND METHODS TO FACILITATE SENSOR CAPABILITY IN DEVICES

CROSS REFERENCE TO RELATED APPLICATIONS

This application claims the benefit of and priority to U.S. Provisional Patent Application No. 62/891,836 filed Aug. 26, 2019 and entitled "DEVICE ATTACHMENT SYSTEMS AND METHODS TO FACILITATE SENSOR CAPABILITY IN DEVICES," which is incorporated herein by reference in its entirety.

TECHNICAL FIELD

One or more embodiments relate generally to electronic devices and more particularly, for example, to device attachment systems and methods to facilitate sensor capability in devices.

BACKGROUND

Various types of portable electronic devices, such as smart phones, cell phones, tablet devices, portable media players, portable game devices, digital cameras, and laptop computers, are in widespread use. These devices typically include a visible-light image sensor or camera that allows users to take a still picture or a video clip. One of the reasons for the increasing popularity of such embedded cameras may be the ubiquitous nature of mobile phones and other portable electronic devices. Because users may already be carrying mobile phones and other portable electronic devices, such embedded cameras are always at hand when users need one. Another reason for the increasing popularity may be the increasing processing power, storage capacity, and/or display capability that allow sufficiently fast capturing, processing, and storage of large, high quality images using mobile phones and other portable electronic devices.

SUMMARY

In one or more embodiments, a sensor device includes an attachment body configured to be disposed along a side of a user device when the sensor device is coupled to the user device. The sensor device further includes an actuator configured to selectively apply a force. The sensor device further includes a connector block coupled to the actuator and configured to selectively extend from or retract into the attachment body in response to the force. The sensor device further includes a connector configured to couple to a connector port of the user device and provide data communication between the sensor device and the user device. The connector is at least partially disposed in the connector block.

In one or more embodiments, a method includes applying a first force on a connector block of a sensor device to extend the connector block, where the connector block is disposed at least partially within an attachment body of the sensor device. The method further includes coupling to a user device the sensor device using a connector of the sensor device, where the connector is at least partially disposed in the connector block. The method further includes contacting the sensor device to a side of the user device, where a side of the attachment body faces the side of the user device upon the contacting. The method further includes applying, by the attachment body, a second force on the user device to at least partially secure the sensor device to the user device.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
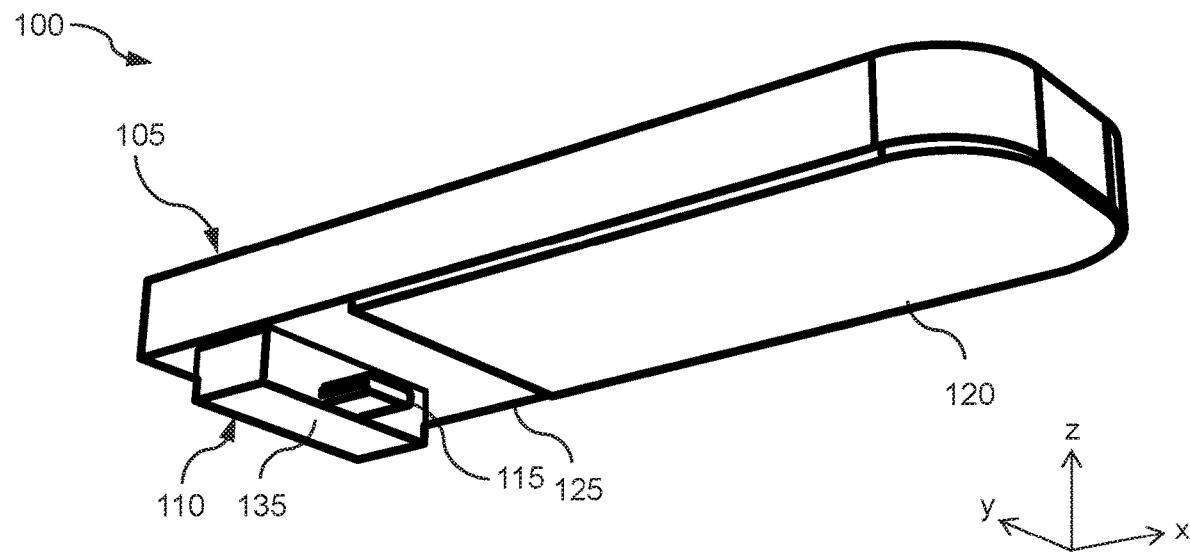
FIG. 1 illustrates a perspective view of a device attachment in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate coupling of a device attachment to a device in a user friendly and secure (e.g., sturdy) manner. The device attachment may couple (e.g., releasably couple, releasably attach) to the device to support operation of the device attachment with the device. In various embodiments, the device attachment may provide sensor capability (e.g., also referred to as sensor/sensing functionality or simply capability/functionality) unavailable in the device and/or supplement or replace a sensor capability already available in the device. As an example, the device attachment may provide thermal infrared imaging capability to the device when the device is not capable of thermal infrared imaging or a thermal infrared camera of the device is broken. As another example, the device attachment may replace a visible-light sensing capability already available in the device when a visible-light sensor of the device attachment provides higher quality visible-light imaging than a built-in visible-light camera of the device. The device attachment may be referred to as a device accessory, an accessory, a sensor device, or variant thereof (e.g., sensor accessory). By way of non-limiting examples, the device may be a mobile phone (e.g., a smart phone), a personal digital assistant (PDA) device, a tablet device, a laptop device, a video game device, a media player, a digital camera, a camcorder, a digital video recorder, or other device. In some cases, the device may be utilized to process, display, and/or store data provided by the device attachment.

In some embodiments, the device attachment may include a connector that couples to an appropriate connector port of the device and supports data communication between the device attachment and the device. By way of non-limiting examples, the connector may be a Universal Serial Bus (USB) connector, a Portable Digital Media Interface (PDMI) connector, a Lightning connector, or other type of connector. The device attachment may also include an attachment body, an actuator system, and a connector block. The connector block may be selectively extended from or retracted into the attachment body based on a force applied to the connector block by one or more actuators of the actuator system. The attachment body may have a dedicated cavity defined therein, and the connector block may slide into and slide out of the dedicated cavity. A height or a length of the connector block may refer to an extent of the connector block that is protruding from the attachment body along the dimension/direction that the connector block extends and retracts. The actuator system may include one or more actuators to cause extension and retraction of the connector block. As non-limiting examples, an actuator may include a spring, a screw, a bendable blade, a button, and/or other component. In some aspects, one actuator may control a force applied by another actuator. As an example, a first actuator may be a button disposed on the attachment body that, when pressed and held by a user, causes a second actuator (e.g., a bendable blade) to apply a force on the connector block to extend the connector block. When the first actuator is released by the user (e.g., no longer pressed and held), a third actuator (e.g., a spring) may apply a force (e.g., a spring force) to retract the connector block.

The connector block may be extended to facilitate coupling of the connector coupled to the device (e.g., an appropriate connector port of the device). The connector block may then be retracted until the attachment body is disposed along a side (e.g., a surface) of the device to facilitate securing (e.g., at least partially securing) the device attachment to the device (e.g., help hold the device attachment in place). The side may be a backside of the device. In being disposed along the side of the device, the attachment body presses against (e.g., applies a force/pressure on) the device to facilitate the securing of the device attachment to the device. In an aspect, a contact layer (e.g., a high friction surface such as rubber) may be disposed on the attachment body. The contact layer may be in direct physical contact with the device and press against the device. Since pressure is a force applied in a given area, the term "force" as used herein may be used interchangeably with the term "pressure".

Using the extendable and retractable connector block, the device attachment may accommodate coupling of the device attachment to devices from different manufacturers and/or having different thicknesses and/or other dimensions. The device attachment may couple to the device even when a protective case is around the device. For a given device, adjustability of the connector block's height facilitates coupling of the device attachment to the device regardless of a protective case (if any) around the device. In this regard, the connector block may be adjusted as appropriate to accommodate devices and associated protective cases of various thicknesses. The term device may refer to the device by itself or the device together with a protective case around the device. As such, the phrase "a thickness of a device" may refer to a thickness of the device by itself or a sum of a thickness of the device and a thickness of a protective case around the device.

When the device attachment is coupled (e.g., releasably coupled) to the device, the attachment body lies flat against a side (e.g., a backside) of the device. The attachment body applies a force (e.g., a gentle pressure) against the port of the device and the side of the device that is lying against the side of the device attachment. The device attachment sits on the connector without shaking or rattling. A user may hold on to the device as desired by the user (e.g., in a manner similar to holding the device when the device attachment is not coupled) to get good ergonomics while not having to worry that the device attachment will come loose and drop to the ground (e.g., even when holding the device upside down). Using various embodiments, device attachments discussed herein are readily attached, de-attached, and re-attached, allow good ergonomics with the device attachments sitting behind the device, allow sturdy installation with little to no risk to the device attachment coming loose, and ability to freely move the device attachment between different devices of different sizes and different cases/covers.

Figure 2:
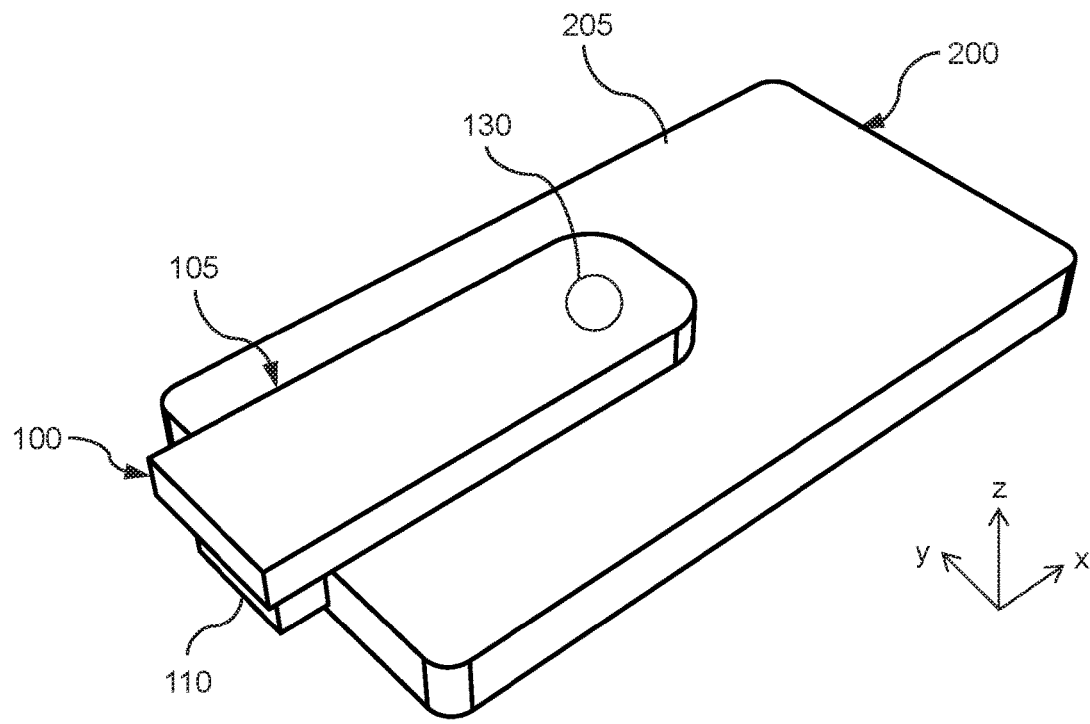
FIG. 2 illustrates a perspective view of a device attachment coupled to a device in accordance with one or more embodiments of the present disclosure.

Referring now to the drawings, FIG. 1 illustrates a perspective view of a device attachment 100 in accordance with one or more embodiments of the present disclosure. FIG. 2 illustrates a perspective view of the device attachment 100 coupled (e.g., releasably coupled) to a device 200 in accordance with one or more embodiments of the present disclosure. Not all of the depicted components may be required, however, and one or more embodiments may include additional components not shown in FIGS. 1 and 2. Variations in the arrangement and type of the components may be made without departing from the spirit or scope of the claims as set forth herein. Additional, fewer, and/or different components may be provided.

The device 200 may be any type of electronic device (e.g., a portable electronic device) that may be configured to communicate with device attachment 100. By way of non-limiting examples, the device 200 may be a mobile phone (e.g., a smart phone), a PDA device, a tablet device, a laptop device, a video game device, a media player, a digital camera, a camcorder, or a digital video recorder. The device attachment 100 may provide sensing capability unavailable in the device 200 (e.g., the device 200 is not capable of infrared imaging or an infrared camera of the device 200 is broken). Alternatively or in addition, the device attachment 100 may supplement or replace sensing capability already available in the device 200 (e.g., the sensor 130 provides higher quality visible-light imaging than a built-in camera of the device 200).

With reference to FIGS. 1 and 2, the device attachment 100 includes an attachment body 105, a connector block 110, a connector 115, a contact layer 120 disposed on a side 125 of the attachment body 105, and a sensor 130. The connector block 110 may selectively extend from or retract into the attachment body 105 as appropriate to facilitate attaching and securing of the device attachment 100 to the device 200. In an aspect, the connector block 110 may slide into and slide out of a dedicated cavity defined in the device attachment 100 to retract into and extend from, respectively, the device attachment 100. The device attachment 100 may include one or more actuators coupled to the connector block 110. The actuator(s) may apply a force to the connector block 110 to extend the connector block 110 or apply a force to retract the connector block 110. In FIGS. 1 and 2, the connector block 110 extends downward along a vertical axis (e.g., the z-axis) and retracts upwards along the vertical axis. The actuator(s) may be disposed at least partially in the attachment body 105 and the connector block 110. The actuator(s) may include a spring(s), a bolt(s), a screw(s), a bendable blade(s), a button(s), a linkage component(s)/system(s), and/or other components.

The connector 115 may be coupled (e.g., releasably coupled) to the device 200 to provide data communication between the device attachment 100 and the device 200. As one example, communicated data may include data captured by the sensor 130 (e.g., raw captured data and/or processed data) and transmitted by the device attachment 100 to the device 200 via the connector 115. As another example, communicated data may include control signals from the device 200 to the device attachment 100 to control operation of device attachment 100. In some cases, the connector 115 may pass electrical power from the device attachment 100 to the device 200, or vice versa. The connector 115 may be any connector appropriate to interface with the device 200. By way of non-limiting examples, the connector 115 may be a Universal Serial Bus (USB) connector, a Portable Digital Media Interface (PDMI) connector, a Lightning connector, or other type of connector. The device 200 has an appropriate connector port to receive the connector 115.

The sensor 130 may include an imager, a temperature sensor, a moisture sensor, a proximity sensor, a laser rangefinder, a radar sensor, a sonar sensor, an antenna, and/or other sensor. As an example, the sensor 130 may include an imager such as an infrared imager (e.g., thermal infrared imager), a visible-light imager, an ultraviolet imager, and/or generally any imager capable of sensing signals within a desired wavelength. As another example, the sensor 130 may include an antenna(s) for transmitting data and receiving data. In some cases, the antenna(s) may be utilized to implement a radar sensor that can transmit electromagnetic (EM) waves and receive EM waves (e.g., reflections of the transmitted EM waves). It is noted that the positioning of the sensor in FIG. 2 is provided by way of non-limiting example. Dependent on a functionality/capability of the sensor 130, the sensor 130 may be disposed on (e.g., disposed at least partially on) any side of the attachment body 105 or disposed completely within the attachment body 105. In some aspects, multiple sensors may be disposed on and/or within the attachment body 105.

The sensor 130 and/or other sensors (if any) provided by the device attachment 100 may provide sensing capability unavailable in the device 200 and/or supplement or replace sensing capability already available in the device. As one example, the device attachment 100 may provide infrared sensing capability in a case that the device 200 is not capable of infrared imaging or a built-in infrared camera of the device 200 is broken. As another example, the device attachment 100 may provide capability for sensing and handling (e.g., transmitting and/or receiving) signals associated with communication protocols that are not compatible with the device 200. The device attachment 100 may operate as an adapter in this example. For instance, in a case that the device 200 is incompatible with Bluetooth® communications, the device attachment 100 may operate to transmit and/or receive Bluetooth® messages. In this regard, the device attachment 100 may receive Bluetooth® messages, process the messages, and (if necessary dependent on application) relay data associated with the messages to the device 200; and/or the device attachment 100 may generate and transmit Bluetooth® messages based on instructions from the device 200. In some cases, the user may set whether the sensor 130 and/or other sensors of the device attachment 100 supplements (e.g., is used in conjunction with) or replaces a corresponding built-in sensing capability of the device 200. In some aspects, the device attachment 100 may include processing circuitry and/or other circuitry to process data captured by the sensor 130 and/or other sensors and facilitate communication of data (e.g., perform appropriate packetizing, depacketizing, encryption, and/or decryption) between the device attachment 100 and the device 200.

Coupling the device attachment 100 to the device 200 involves inserting the connector 115 into the device 200 and contacting the device attachment 100 (e.g., the attachment body 105 and/or the contact layer 120) to the device 200. The device attachment 100 may lie on a side 205 (e.g., backside/back surface) of the device 200. In an aspect, when the device attachment 100 is coupled to the device 200, the attachment body 105 is disposed along and presses against the side 205 of the device 200. In one example, the contact layer 120 is a high friction surface that helps keep the device attachment 100 in place. For instance, the contact layer 120 may be a layer of rubber. The contact layer 120 may prevent movement (e.g., sideways movement) of the device attachment 100. In an aspect, rather than having the contact layer 120 disposed on the side 125 of the attachment body 105, the contact layer 120 may be formed integrally with (e.g., as part of and/or in a single piece with) the side 125. In some cases, the contact layer 120 is optional. In these cases, the side 125 of the attachment body 105 is in direct contact with the device 200. In some cases, a metal sheet (not shown) may be disposed behind the contact layer 120 or behind the side 125. The metal sheet may provide structural support and/or attract a magnet. In some embodiments, the device attachment 100 may include (e.g., formed as part of manufacturing of the device attachment 100) or may have disposed thereon post-manufacturing magnets and/or adhesives to provide permanent or long-term coupling of the device attachment 100 and the device 200. Such magnets and/or adhesives may be disposed on the side 125 of the attachment body 105.

It is noted that FIGS. 1 and 2 illustrate a non-limiting example of a device attachment. A device attachment may have a different shape from that shown in FIGS. 1 and 2. For example, rather than a substantially rectangular parallelepiped shape as shown, the attachment body and/or the connector block may have a circular shape, an elliptical shape, a triangular shape, and/or generally any shape appropriate to provide the device attachment with an appropriate coupling capability and/or appearance. A device attachment may have more, fewer, and/or different components from those illustrated in FIGS. 1 and 2. For example, alternative or in addition to the contact layer 120, a device attachment may include one or more engagement mechanisms (e.g., clips, clamps, latches) disposed on a side (e.g., the side 125) and/or disposed in proximity to a connector to facilitate coupling of the device to the device attachment. In some aspects, the connector 115 may be capable of retracting into or extending from the connector block 110 as appropriate to facilitate attachment and securing of the connector 115 to the device 200. Examples of a retractable connector are provided in U.S. Patent Application Publication No. 2019/0221968, which is incorporated herein by reference in its entirety.

Figure 3A:
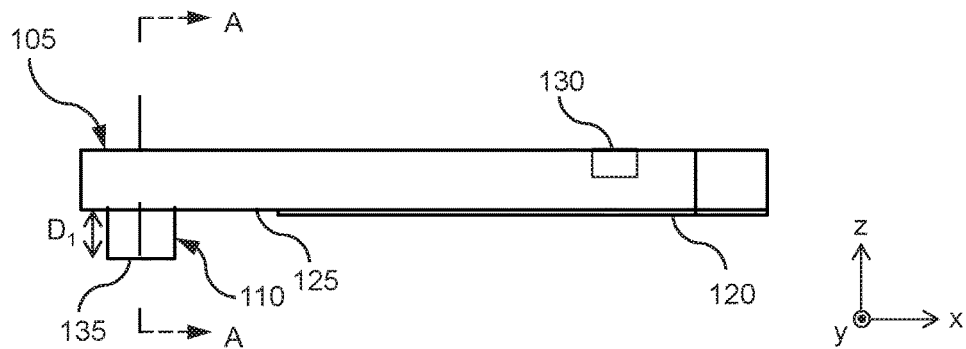
FIGS. 3A through 3C illustrate side views associated with coupling a device attachment to a device in accordance with one or more embodiments of the present disclosure.
Figure 3B:
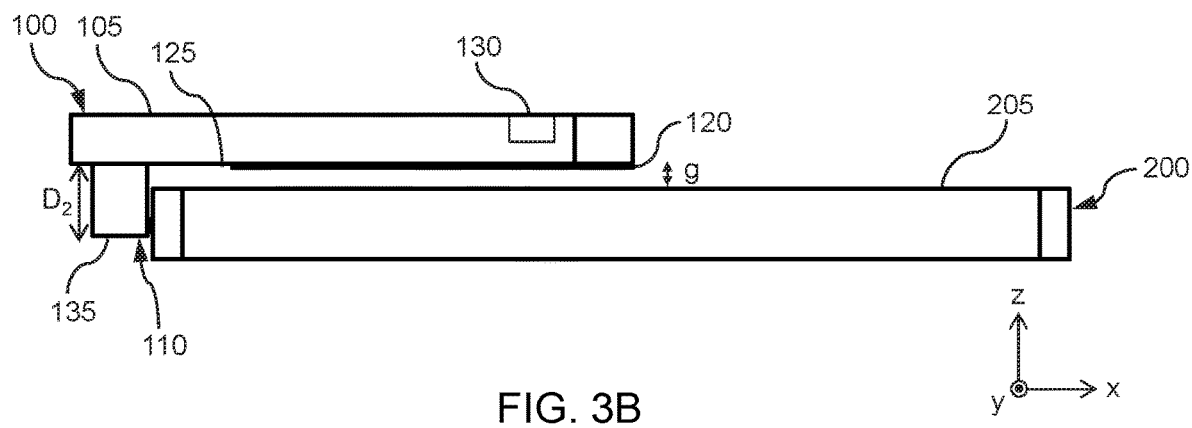
Figure 3C:
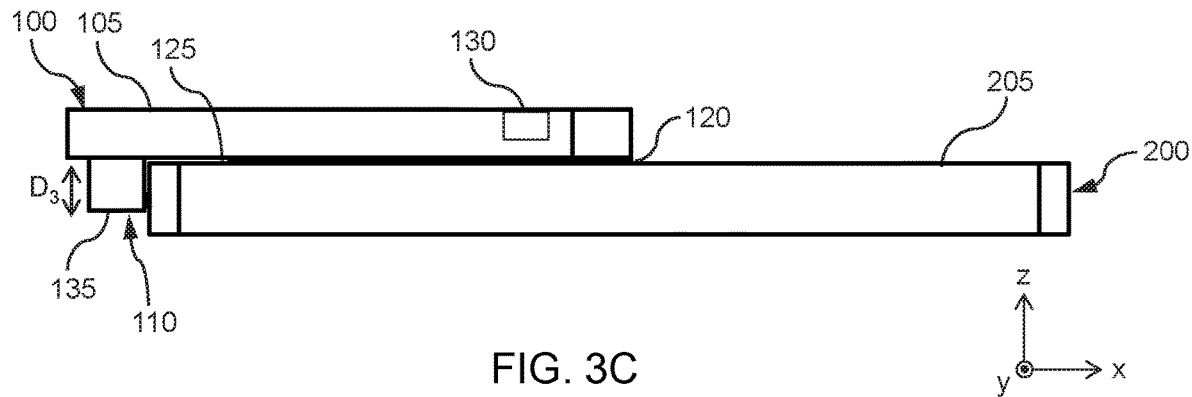

FIGS. 3A through 3C illustrate side views associated with coupling the device attachment 100 to the device 200 in accordance with one or more embodiments of the present disclosure. FIG. 3A illustrates a side view of the device attachment 100 prior to coupling to the device 200. An exposed portion of the connector block 110 has a length $D_1$. The length $D_1$ is a distance between a side 135 of the connector block 110 and the side 125 of the attachment body 105. The exposed portion refers to a portion of the connector block 110 that is external to the attachment body 105. A remaining portion of the connector block 110 is within the attachment body 105. The length $D_1$ may be a default length of the connector block 110. In some cases, to reduce a size of the device attachment 100 when not coupled to the device 200, the connector block 110 may be completely within the attachment body 105 (e.g., the connector block 110 has no exposed portion that protrudes from the attachment body 105). The length $D_1$ may be considered to be zero whenever the connector block 110 is completely within (e.g., completely stowed within) the attachment body 105. In an aspect, the connector block 110 extends from and retracts into the attachment body 105 as the connector block 110 slides out of and into, respectively, a dedicated cavity of the attachment body 105.

In FIG. 3B, the connector block 110 is extended (e.g., through control by a user) such that the exposed portion of the connector block 110 has a length $D_2 > D_1$. Extending of the connector block 110 beyond the length $D_1$ may provide clearance between the device attachment 100 and the device 200 to facilitate insertion of the connector 115 (e.g., Type-C USB connector) into an appropriate/corresponding connector port (e.g., Type-C USB port) of the device 200 by the user. As an example, when the connector 115 is inserted into the device 200, a gap of distance g is between the contact layer 120 of the device attachment 100 and the side 205 of the device 200. The distance $D_2$ associated with the connector block 110 is adjustable and thus the distance g associated with the gap is also adjustable. The adjustable distances may facilitate coupling of the device attachment 100 to various devices (e.g., different device models and/or different types of devices) of varying thicknesses and protective cases (if present around the devices) of varying thicknesses.

In FIG. 3C, once the connector 115 is inserted, the connector block 110 is then retracted inwards toward the attachment body 105 such that the device attachment 100 (e.g., the side 125 and/or the contact layer 120) presses against the device 200 (e.g., the side 205 of the device 200) to at least partially secure the device attachment 100 to the device 200 to keep the device attachment 100 in place. The connector block 110 has a length $D_3 \geq D_1$ when the device attachment 100 is coupled to the device 200. Non-limiting mechanisms for extending and retracting the connector block 110 are described with respect to FIGS. 4-7.

Although FIGS. 3A-3C illustrate a sequence for coupling the device attachment 100 to the device 200 in which the connector block 110 is extended relative to the default length $D_1$ to perform the coupling (e.g., $D_3 \geq D_1$, in other cases the connector block 110 is retracted relative to the default length $D_1$ to perform the coupling (e.g., $D_3 < D_1$.

When the device attachment 100 is coupled (e.g., releasably coupled) to the device 200, the attachment body 105 applies a force (e.g., a gentle pressure) against the port of the device 200 and the side 205 of the device that is lying against the side 125 of the device attachment 100. In this context, the device attachment 100 may be considered coupled to the device 200 when the connector 115 is coupled to the appropriate port of the device 200 and the side 205 of the device 200 lies against the side 125 of the device attachment 100, such as a surface of the contact layer 120 (as depicted in FIGS. 2 and 3C) and/or the side 125. In some contexts, the device attachment 100 may be referred to as being coupled to the device 200 when the connector 115 is coupled to the appropriate port of the device 200, with or without the side 205 of the device 200 having been disposed to lie against the side 125 of the device attachment 100.

Figure 4:
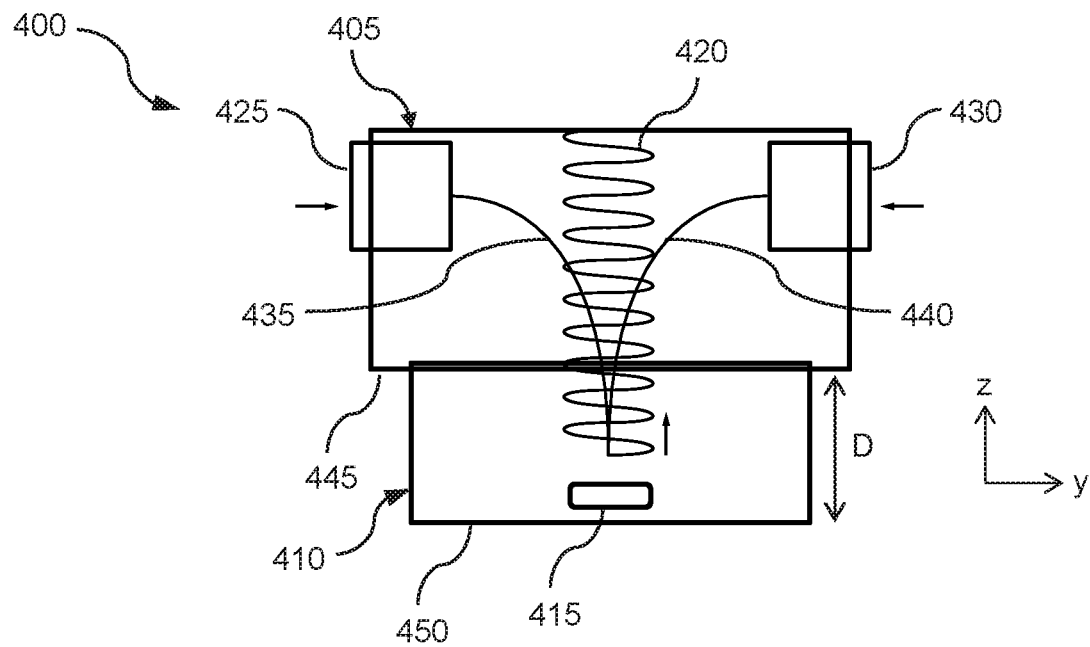
FIGS. 4 through 7 illustrates a cross-sectional side view of a device attachment and its associated actuator system in accordance with one or more embodiments of the present disclosure.

FIG. 4 illustrates a cross-sectional side view of a device attachment 400 in accordance with one or more embodiments of the present disclosure. Not all of the depicted components may be required, however, and one or more embodiments may include additional components not shown in FIG. 4. Variations in the arrangement and type of the components may be made without departing from the spirit or scope of the claims as set forth herein. Additional, fewer, and/or different components may be provided. In some embodiments, FIG. 4 illustrates a cross-sectional side view taken along a plane formed by a lines A-A identified in FIG. 3A. In some embodiments, the device attachment 400 may be, may include, or may be a part of, the device attachment 100, respectively.

The device attachment 400 includes an attachment body 405, a connector block 410, a connector 415, and an actuator system. The actuator system is utilized to cause the connector block 410 to extend from or retract into the attachment body 405. The connector block 410 may extend from the attachment body 405 or retract into the attachment body 405 by sliding out through or sliding in through, respectively, the attachment body 405 (e.g., through a dedicated cavity of the attachment body 405). In FIG. 4, the actuator system includes a spring 420, buttons 425 and 430, and bendable blades 435 and 440. Each of these components (e.g., 420, 425, 430, 435, and 440) may be considered a single actuator of the actuator system. The spring 420 and the bendable blades 435 and 440 are disposed partially within the attachment body 405 and the connector block 410. The buttons 425 and 430 are disposed partially within the attachment body 405. Since the buttons 425 and 430 are provided on opposing sides of the attachment body 405, the buttons 425 and 430 may be referred to as side buttons.

The spring 420 is coupled to the connector block 410 and the bendable blades 435 and 440. The buttons 425 and 430 are coupled to the bendable blades 435 and 440, respectively. In this regard, the buttons 425 and 430 control operation of the bendable blades 435 and 440, respectively, and thus control operation of the spring 420 coupled to the bendable blades 435 and 440.

When the buttons 425 and 430 are not pressed, an exposed portion of the connector block 410 is maintained at a length $D=D_1$, where D is a distance between a side 445 of the attachment body 405 and a side 450 of the connector block 410. The length $D_1$ may be referred to as an at rest length of the connector block 410. As indicated previously, the distance $D_1$ may be zero in some cases (e.g., the connector block 410 is completely within the attachment body 405).

When the buttons 425 and 430 are pressed and held (e.g., by the user), as shown by the right-pointing arrow pointing toward the button 425 and the left-pointing arrow pointing toward the button 430, the bendable blades 435 and 440 may apply a force (e.g., presses downward along the z-direction in FIG. 4) on the connector block 410 to cause the connector block to extend such that the distance $D>D_1$. Application of the force on the connector block 410 by the bendable blades 435 and 440 also releases the spring 420 from rest and stretches the spring 420. Thus, the buttons 425 and 430 may be pressed and held to extend the connector block 410 to facilitate coupling of the device attachment 400 to a device (e.g., the device 200 of FIGS. 2, 3B, and 3C). For instance, the user may press and hold the buttons 425 and 430 to facilitate insertion of the connector 415 into an appropriate port of the device. In some aspects, an amount of force applied on the buttons 425 and 430 (e.g., an amount that the buttons 425 and 430 are pushed inwards in FIG. 4) determines the force applied by the bendable blades 435 and 440 on the connector block 410 and thus determines the length D (e.g., the amount by which the connector block 410 extends).

Once the buttons 425 and 430 are released (e.g., no longer pressed and held by the user), the bendable blades 435 and 440 are no longer applying the force (e.g., pushing down) on the connector block 410, and the spring 420 (e.g., having been stretched due to the extension of the connector block 410) responds by applying a force (e.g., a spring force) that causes the spring 420 and thus the connector block 410 to retract toward the attachment body 405. Retraction by the spring 420 may be referred to as an automatic retraction. The user may release the buttons 425 and 430 soon after the connector 415 has been inserted into the device. In this case, the force applied by the spring 420 may cause the connector block 410 to retract toward $D=D_1$ until a side of the attachment body 405 and/or a side of a layer disposed on the attachment body 405 (e.g., the contact layer 120) is in contact with (e.g., presses against) the device (e.g., a back side of the device). Dependent on a dimension of the device along the z-dimension, the distance D may be greater than or equal to $D_1$ when a side of the attachment body 405 and/or a side of a layer disposed on the attachment body 405 is in contact with the device.

Although the bendable blades 435 and 440 are utilized in the actuator system of FIG. 4, generally any component (e.g., linkage system(s)) that may operate to extend the connector block 410 (e.g., through electrical and/or mechanical control) may be utilized in place of the bendable blades 435 and 440. Similarly, although the spring 420 is utilized in the actuator system of FIG. 4, any component that may operate to retract the connector block 410 (e.g., through electrical and/or mechanical control) may be utilized in place the spring 420.

Figure 5:
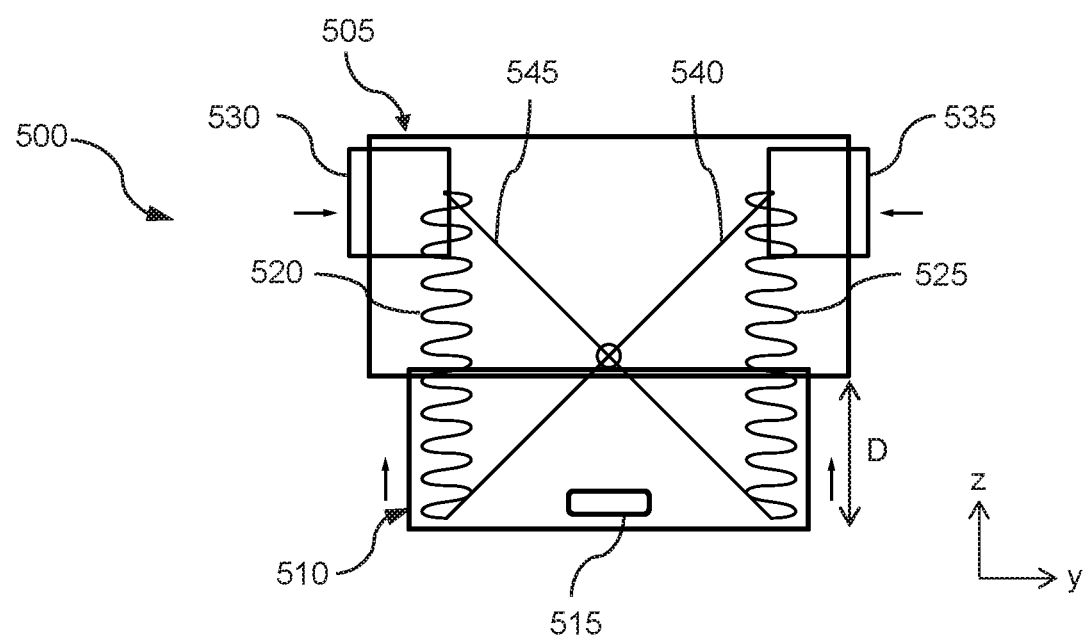

FIG. 5 illustrates a cross-sectional side view of a device attachment 500 in accordance with one or more embodiments of the present disclosure. Not all of the depicted components may be required, however, and one or more embodiments may include additional components not shown in FIG. 5. Variations in the arrangement and type of the components may be made without departing from the spirit or scope of the claims as set forth herein. Additional, fewer, and/or different components may be provided. In some embodiments, FIG. 5 illustrates a cross-sectional side view taken along a plane formed by a lines A-A identified in FIG. 3A. In some embodiments, the device attachment 500 may be, may include, or may be a part of, the device attachment 100. The description of FIG. 4 generally applies to FIG. 5, with examples of differences between FIGS. 4 and 5 and other description provided herein.

The device attachment 500 includes an attachment body 505, a connector block 510, a connector 515, and an actuator system. In FIG. 5, the actuator system includes springs 520 and 525, buttons 530 and 535, and linkage systems that couple the buttons 530 and 535 to the springs 420 and 525. The linkage systems may include a cross-linkage 540 between the button 535 and the spring 520 and a cross-linkage 545 between the button 530 and the spring 525. The springs 520 and 525, buttons 530 and 535, and the linkage systems may each be considered an actuator. The cross-linkages 540 and 545 have an axis in the center. The springs 520 and 525 and the linkage systems are disposed partially within the attachment body 505 and the connector block 510. The buttons 530 and 535 are disposed partially within the attachment body 505. The springs 520 and 525 are each coupled to the connector block 510 and the buttons 530 and 535 via the linkage systems.

When the buttons 530 and 535 are not pressed, an exposed portion of the connector block 510 is maintained at a length $D=D_1$. When the buttons 530 and 535 are pressed and held (e.g., by the user), the linkage system may apply a force on the connector block 510 to cause the connector block 510 to extend such that the distance $D>D_1$. Application of the force on the connector block 510 by the linkage systems also releases the springs 520 and 525 from rest and stretches the springs 520 and 525. In some aspects, an amount of force applied on the buttons 530 and 535 (e.g., an amount that the buttons 530 and 535 are pushed inwards in FIG. 4) determines the force applied by the linkage systems on the connector block b10 and thus determines the length D (e.g., the amount by which the connector body b10 extends).

Once the buttons 530 and 535 are released, the linkage systems are no longer applying the force on the connector block 510, and the springs 520 and 525 respond by applying a force that causes the connector block 510 to retract toward the attachment body 505. In this case, the force applied by the springs 520 and 525 may cause the connector block 510 to retract toward $D=D_1$ until a side of the attachment body 505 and/or a side of a layer disposed on the attachment body 505 (e.g., the contact layer 120) is in contact with (e.g., presses against) the device (e.g., a backside of the device). Dependent on a dimension of the device along the z-dimension, the distance D may be greater than or equal to $D_1$ when a side of the attachment body 505 and/or a side of a layer disposed on the attachment body 505 is in contact with the device.

Figure 6:
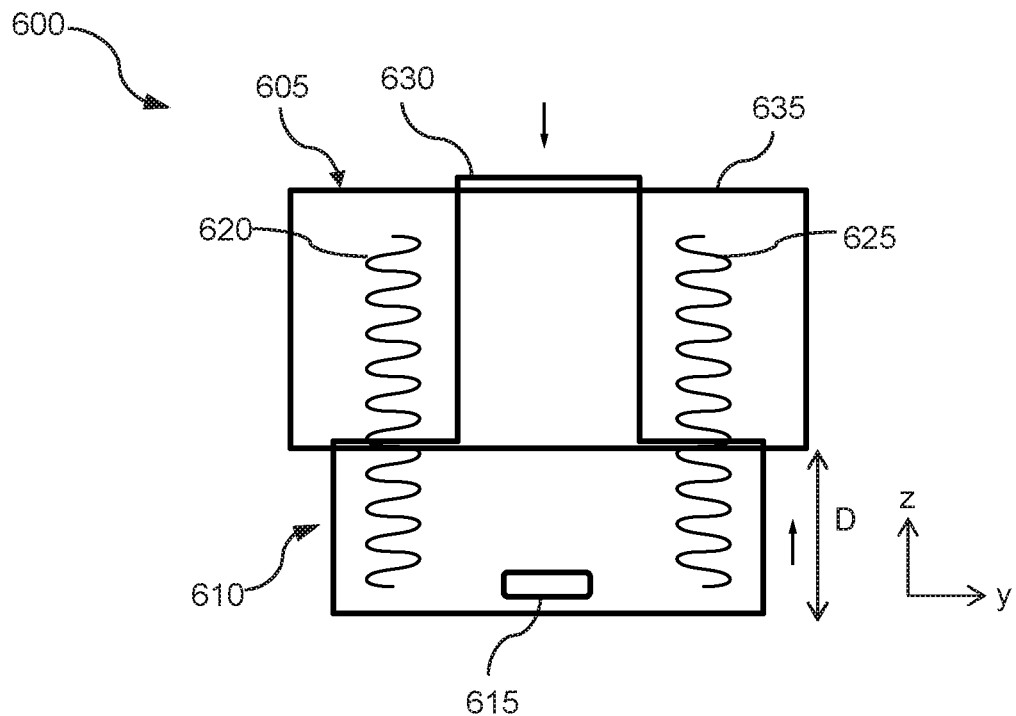

FIG. 6 illustrates a cross-sectional side view of a device attachment 700 in accordance with one or more embodiments of the present disclosure. Not all of the depicted components may be required, however, and one or more embodiments may include additional components not shown in FIG. 6. Variations in the arrangement and type of the components may be made without departing from the spirit or scope of the claims as set forth herein. Additional, fewer, and/or different components may be provided. In some embodiments, FIG. 6 illustrates a cross-sectional side view taken along a plane formed by a lines A-A identified in FIG.

3A. In some embodiments, the device attachment 600 may be, may include, or may be a part of, the device attachment 100. The description of FIG. 4 generally applies to FIG. 6, with examples of differences between FIGS. 4 and 6 and other description provided herein.

The device attachment 600 includes an attachment body 605, a connector block 610, a connector 615, and an actuator system. The actuator system includes springs 620 and 625 and a button 630. The springs 620 and 625 and the button 630 may each be considered an actuator. When the button 630 is pressed and held (e.g., by the user), the force applied on the button 630 transfers to a force applied on the connector block 610 to extend the connector block 610. In response to the force applied to the button 630 (and by extension the connector block 610), the springs 620 and 625 are released from reset and stretched. In some aspects, an amount of force applied to the button 630 (e.g., an amount that the button 630 is pushed downward in FIG. 6) determines the force applied on the connector block 610 and thus determines the distance D (e.g., the amount by which the connector block 610 extends). Once the button 630 is released, the force applied on the connector block 610 by the press of the button 630 is removed and the springs respond by applying a force that causes the connector block 610 to retract toward the attachment body 605.

In FIG. 6, a portion of the button 630 protrudes from a side 635 of the attachment body 605. In another case, a button may completely disposed within the attachment body (e.g., below the side 635). When the button is completely disposed within the attachment body, the button may be more appropriately interacted with (e.g., more readily accessible) using a tool of an appropriate size that is insertable into a cavity of the activity body within which the button is disposed, rather than the user's finger(s). The tool may be a dedicated tool (e.g., provided by a manufacturer of the device attachment), a stylus, a rod, or any appropriate tool that is designed for interaction with the button or that can be improvised by the user for use in interacting with the button.

Figure 7:
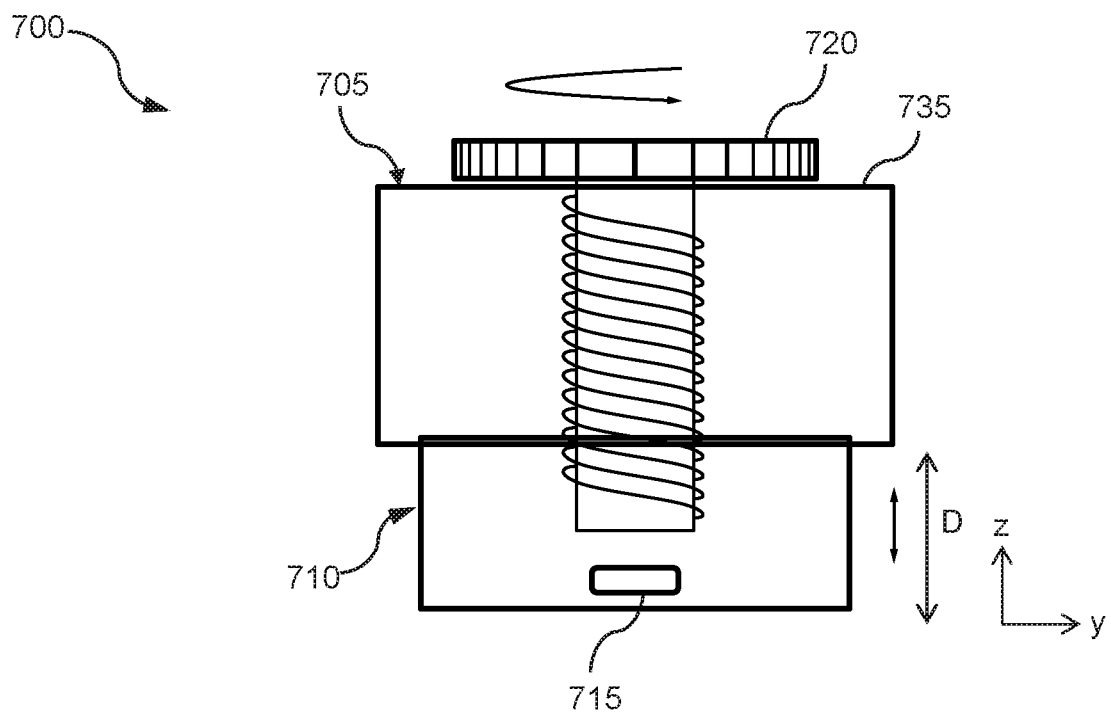

FIG. 7 illustrates a cross-sectional side view of a device attachment 700 in accordance with one or more embodiments of the present disclosure. Not all of the depicted components may be required, however, and one or more embodiments may include additional components not shown in FIG. 7. Variations in the arrangement and type of the components may be made without departing from the spirit or scope of the claims as set forth herein. Additional, fewer, and/or different components may be provided. In some embodiments, FIG. 7 illustrates a cross-sectional side view taken along a plane formed by a lines A-A identified in FIG. 3A. In some embodiments, the device attachment 700 may be, may include, or may be a part of, the device attachment 100.

The device attachment 700 includes an attachment body 705, a connector block 710, a connector 715, and an actuator system. The actuator system includes a screw. The screw may be considered an actuator of the actuator system. The connector block 710 is extended from and retracted into the attachment body 705 by rotating the screw 720. In an aspect, the screw 720 may be rotated clockwise to tighten the screw 720 and cause a force to be applied on the connector block 710 to extend the connector block 710, and the screw 720 may be rotated counterclockwise to loosen the screw 720 to cause retraction of at least a portion of the applied force against the connector block 710 and thus cause retraction of the connector block 710. Such retraction of the screw 720 and the connector block 710 may be referred to as manual retractions.

As an example, the user may rotate the screw 720 clockwise to increase the distance D and insert the connector 715 into the device (e.g., into an appropriate port of the device). In some cases, the user may rotate the screw 720 using a screwdriver, a hex wrench, or other appropriate tool (e.g., based on a size and shape of the screw 720). In some cases, the screw 720 may be amenable to rotation using the user's fingers. Once the connector 715 is inserted, the user may rotate the screw 720 counterclockwise to decrease the distance D until a side 735 of the attachment body 705 and/or a side of a layer disposed on the attachment body 705 (e.g., the contact layer 120) is in contact with (e.g., presses against) the device (e.g., a backside of the device).

In each of FIGS. 4-7, when a device attachment (e.g., 400, 500, 600, 700) is coupled (e.g., releasably coupled) to a device, an attachment body of the device attachment applies a force (e.g., a gentle pressure) against a port of the device within which a connector is inserted and a side of the device that is lying against a surface of the device attachment. In some aspects, a connector block may have an exposed portion of length D for any D between a minimum $D_{min}$ and a maximum $D_{max}$.

In other aspects, a connector block may have an exposed portion of length D for discrete values of D between $D_{min}$ and $D_{max}$. For example, the screw 720 may have threads that allows discrete values of D for the connector block 710 (e.g., rather than allowing any value of D between $D_{min}$ and $D_{max}$).

Components of the device attachment may be collectively constructed as appropriate to provide in-built protection and/or inherent protection that prevents damage to the device attachment and the device. With reference for example to FIGS. 4-6, the attachment body, connector block, connector, and spring(s) are collectively constructed to prevent too much force from being applied to the spring(s), the port of the device, and/or other components of the device attachment and/or the device. This force may cause, among other things, the spring(s) from being stretched or retracted too far that the spring(s) and/or other components of the device attachment and the device are damaged or broken. In this regard, springs having certain spring characteristics may be selected to calibrate an amount of pressure applied on the port of the device (e.g., according to a standard associated with the port). Similarly, as an example with reference to FIG. 7, the attachment body, connector block, connector, and screw are collectively constructed to prevent the screw(s) from being tightened too much. Too much tightening may cause damage at least to the port (e.g., USB port) of the device within which the connector of the device attachment is inserted.

It is noted that FIGS. 4-7 provide examples of a device attachment. Fewer, more, and/or different actuators may be provided by the device attachment. In this regard, actuators (e.g., springs, screws, buttons) may be positioned different from the positions shown in FIGS. 4-7. For example, buttons and/or screws may be mounted on the sides of the attachment body, the top of the attachment body, and/or at other locations based on factors such as cost, reliability, accessibility for user interaction, and/or other factors. Actuators are represented by springs, screws, and buttons in the figures, although generally any component that can be utilized to cause extension and/or retraction of the connector block may be utilized as actuators. Another example of an actuator may be a slider that the user can, for instance, slide along one direction to extend the connector block and slide along the other direction to retract the connector block. In some embodiments, an exposed portion of a connector block may be of an appropriate size such that the user can manually pull (e.g., using fingers, a dedicated tool, a tweezer, and/or other tool) the connector block to extend the connector block and push the connector block to retract the connector block.

Figure 8:
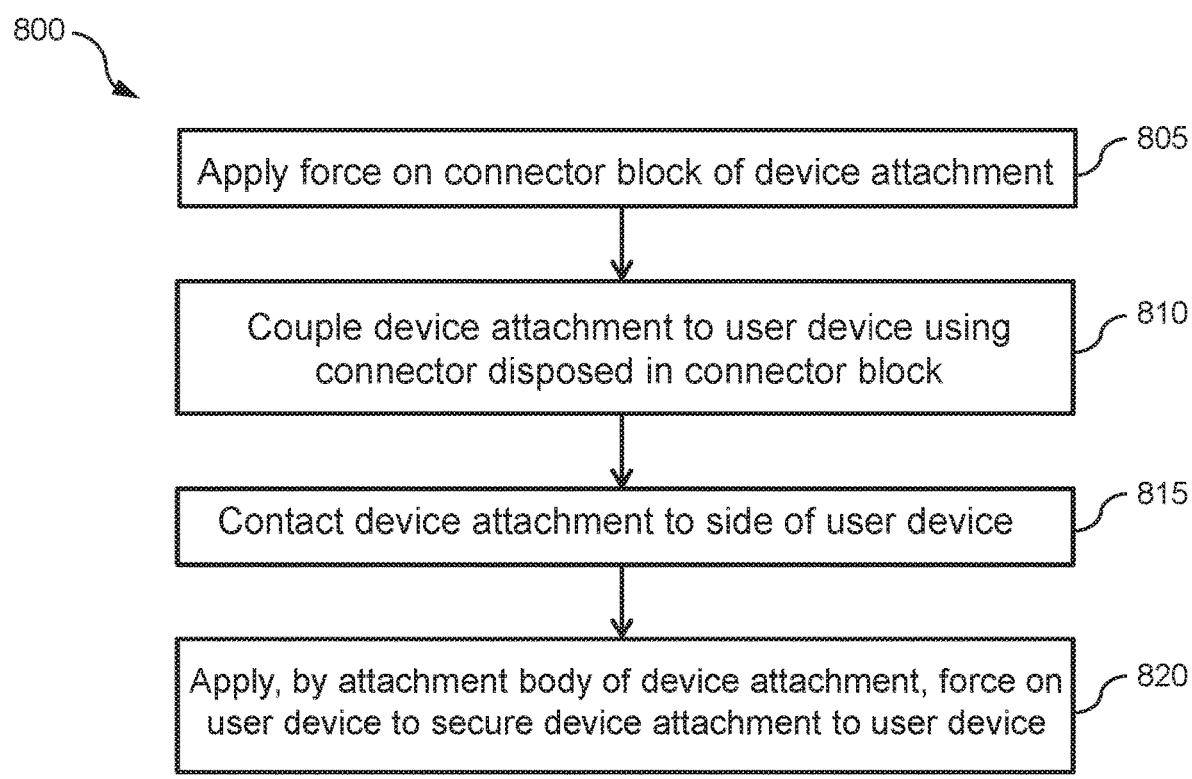
FIG. 8 illustrates a flow diagram of an example process for facilitating coupling of a device attachment to a device in accordance with one or more embodiments of the present disclosure.

FIG. 8 illustrates a flow diagram of an example process 800 for facilitating coupling of a device attachment to a device in accordance with one or more embodiments of the present disclosure. Although the process 800 is described with reference to FIGS. 3A-3C, the process 800 may be performed for other device attachments and devices. Note that one or more operations in FIG. 8 may be combined, omitted, and/or performed in a different order as desired.

At block 805, a force is applied on the connector block 110 of the device attachment 100. The applied force may cause the connector block 110 to extend. The force may be applied by an actuator(s) (e.g., spring, screw) of the device attachment 100. In some cases, a user may directly interact with the actuator(s). For instance, when the actuator is a screw that the user can access, the user can use a screwdriver or other tool to rotate the screw to cause the screw to apply a force on the connector block 110. In other cases, alternatively or in addition, the user may indirectly interact with a first actuator (e.g., the bendable blade 435) via a direct interaction with second actuator (e.g., the button 425). In these cases, the user may directly interact with the second actuator (e.g., pressing a button) coupled to the first actuator, and the second actuator may cause a force to be applied by the first actuator on the connector block 110. At block 810, the device attachment 100 is coupled (e.g., releasably coupled) to the device 200 using the connector 115. The connector 115 (e.g., USB connect) may be received by an appropriate connector port (e.g., USB port) of the device.

At block 815, the device attachment 100 contacts the side 205 of the device 200. The side 205 of the device 200 faces the side 125 of the device attachment 100. In one aspect, as shown in FIG. 3C, the side 205 of the device 200 contacts a side of the contact layer 120 disposed on the attachment body 105. In another aspect, the side 205 of the device 200 may directly contact a side of the attachment body 105 (e.g., without an intervening layer between the side 205 and the attachment body 105). In some aspects, the device attachment 100 may be brought into contact with the side 205 of the device 200 by retracting at least a portion of the force applied on the connector block 110 at block 805. In some cases, dependent on a type of actuator, retraction of the connector block 110 may be associated with an automatic retraction or a manual retraction of an actuator (e.g., a spring). At block 820, a force is applied by the attachment body 105 on the device 200. The force/pressure may be a gentle force/pressure against the port of the device 200 and the side 205 (e.g., backside) of the device 200. The force/pressure may at least partially secure the device attachment 100 to the device 200 such that the device attachment 100 is kept in place. In some cases, the contact layer 120 (e.g., rubber) may be activated by the gentle force/pressure to help keep the device attachment 100 in place.

Using various embodiments, a device attachment includes one or more sensors. By coupling the device attachment to a user device (e.g., a user's smartphone), the user device may utilize data captured by the sensor(s). For instance, a sensor(s) of the device attachment may include an infrared camera(s). By coupling the device attachment to the user device, the user device may utilize infrared image data captured by the sensor(s). In some embodiments, the user device is a portable device. In such embodiments, coupling the device attachment to the user device supports mobile operation of the device attachment in conjunction with the user device. Capability for processing the data captured by the sensor(s) may be included provided in the device attachment, provided in the device, or distributed in both the device attachment and device.

For explanatory purposes, a device attachment (e.g., the device attachment 100) includes a sensor device (e.g., the sensor 130) for providing, supplementing, or replacing imaging capability to a user device, as described with respect to FIGS. 9-13. However, it is noted, alternatively or in addition, other device attachments may include other types of sensors.

Figure 9:
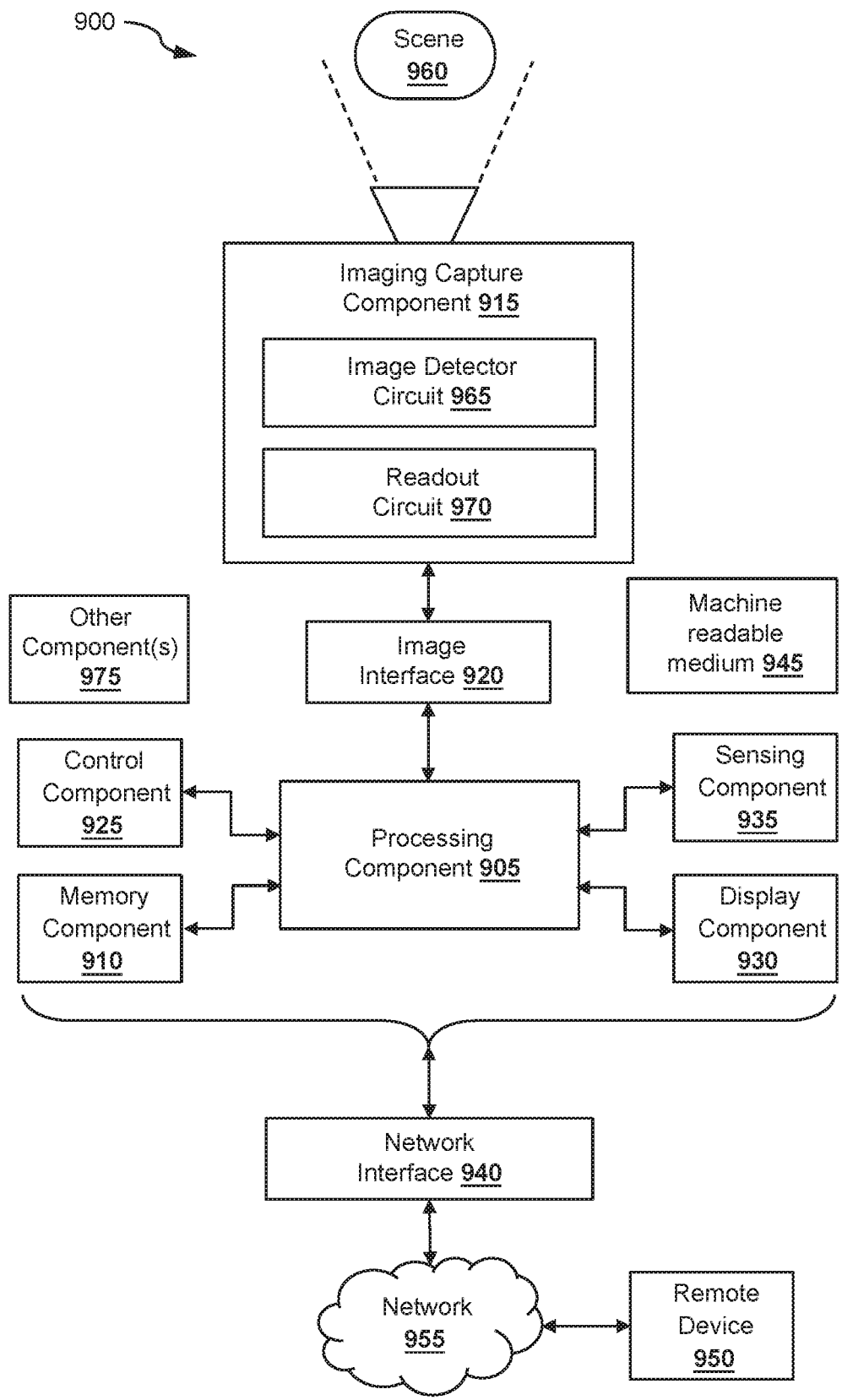
FIG. 9 illustrates a block diagram of an example imaging system in accordance with one or more embodiments of the present disclosure.

FIG. 9 illustrates a block diagram of an example imaging system 900 (e.g., an infrared imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In some embodiments, the device attachment 100 and the device 200 of FIG. 2 collectively (e.g., when the device attachment 100 is coupled to the device 200) may implement the imaging system 900 or portion thereof.

The imaging system 900 may be utilized for capturing and processing images. The imaging system 900 may represent any type of imaging system that detects one or more ranges (e.g., wavebands) of EM radiation and provides representative data (e.g., one or more still image frames or video image frames). The imaging system 900 may include a housing that at least partially encloses components of the imaging system 900, such as to facilitate compactness and protection of the imaging system 900. For example, the solid box labeled 900 in FIG. 9 may represent the housing of the imaging system 900. In an embodiment, the imaging system 900 may be disposed within the attachment body 105 of the device attachment 100. The housing may contain more, fewer, and/or different components of the imaging system 900 than those depicted within the solid box in FIG. 9.

The imaging system 900 includes, according to one implementation, a processing component 905, a memory component 910, an image capture component 915, an image interface 920, a control component 925, a display component 930, a sensing component 935, and/or a network interface 940. The processing component 905, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 905 may be configured to interface and communicate with the various other components (e.g., 910, 915, 920, 925, 930, 935, etc.) of the imaging system 900 to perform such operations. For example, the processing component 905 may be configured to process captured image data received from the imaging capture component 915, store the image data in the memory component 910, and/or retrieve stored image data from the memory component 910. In one aspect, the processing component 905 may be configured to perform various system control operations (e.g., to control communications and operations of various components of the imaging system 900) and other image processing operations (e.g., data conversion, video analytics, etc.).

In some embodiments, the device attachment 100 may include the image capture component 915. The device attachment 100 may capture infrared image data (e.g., thermal infrared image data) of the scene 960 and provide (e.g., using the connector 115 that couples the device attachment 100 to the device 200) the captured infrared image data to the processing component 905 provided by the device 200. In some embodiments, the device attachment 100 may include the image capture component 915 and a portion of the processing component 905. In such embodiments, the device attachment 100 may process captured infrared image data of the scene 960 and provide the processed data to the device 200 using the connector 115.

As an example, the device 200 may infrared image data from the device attachment 100, process the infrared image data to generate user-viewable infrared images (e.g., thermograms), and display the user-viewable infrared images to users and permit the users to store the infrared image data and/or the user-viewable infrared images. To facilitate this example, in some cases, the device 200 may be configured to run appropriate software instructions (e.g., a smart phone software application, also referred to as an "app") to function as an infrared camera that permits users to frame and take infrared still images, videos, or both using the device attachment 100. The device attachment 100 and the device 200 may be configured to perform other infrared imaging functionalities, such as storing and/or analyzing thermographic data (e.g., temperature information) contained within the infrared image data.

The memory component 910 includes, in one embodiment, one or more memory devices configured to store data and information, including infrared image data and information. The memory component 910 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 905 may be configured to execute software instructions stored in the memory component 910 so as to perform method and process steps and/or operations. The processing component 905 and/or the image interface 920 may be configured to store in the memory component 910 images or digital image data captured by the image capture component 915. The processing component 905 may be configured to store processed still and/or video images in the memory component 910.

In some embodiments, a separate machine-readable medium 945 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 945 may be portable and/or located separate from the imaging system 900, with the stored software instructions and/or data provided to the imaging system 900 by coupling the machine-readable medium 945 to the imaging system 900 and/or by the imaging system 900 downloading (e.g., via a wired link and/or a wireless link) from the machine-readable medium 945. It should be appreciated that various modules may be integrated in software and/or hardware as part of the processing component 905, with code (e.g., software or configuration data) for the modules stored, for example, in the memory component 910.

The imaging system 900 may represent an imaging device, such as a video and/or still camera, to capture and process images and/or videos of a scene 960. In this regard, the image capture component 915 of the imaging system 900 may be configured to capture images (e.g., still and/or video images) of the scene 960 in a particular spectrum or modality. The image capture component 915 includes an image detector circuit 965 (e.g., a thermal infrared detector circuit) and a readout circuit 970 (e.g., a readout integrated circuit (ROIC)). For example, the image capture component 915 may include an IR imaging sensor (e.g., IR imaging sensor array) configured to detect IR radiation in the near, middle, and/or far IR spectrum and provide IR images (e.g., IR image data or signal) representative of the IR radiation from the scene 960. For example, the image detector circuit 965 may capture (e.g., detect, sense) IR radiation with wavelengths in the range from around 700 nm to around 2 mm, or portion thereof. For example, in some aspects, the image detector circuit 965 may be sensitive to (e.g., better detect) short-wave IR (SWIR) radiation, mid-wave IR (MWIR) radiation (e.g., EM radiation with wavelength of 2-5 µm), and/or long-wave IR (LWIR) radiation (e.g., EM radiation with wavelength of 7-14 µm), or any desired IR wavelengths (e.g., generally in the 0.7 to 14 µm range). In other aspects, the image detector circuit 965 may capture radiation from one or more other wavebands of the EM spectrum, such as visible-light, ultraviolet light, and so forth.

The image detector circuit 965 may capture image data associated with the scene 960. To capture the image, the image detector circuit 965 may detect image data of the scene 960 (e.g., in the form of EM radiation) and generate pixel values of the image based on the scene 960. An image may be referred to as a frame or an image frame. In some cases, the image detector circuit 965 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 960, with each pixel having a pixel value that represents EM radiation emitted or reflected from a portion of the scene and received by a detector that generates the pixel value. Based on context, a pixel may refer to a detector of the image detector circuit 965 that generates an associated pixel value or a pixel (e.g., pixel location, pixel coordinate) of the image formed from the generated pixel values.

In an aspect, the pixel values generated by the image detector circuit 965 may be represented in terms of digital count values generated based on the electrical signals obtained from converting the detected radiation. For example, in a case that the image detector circuit 965 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 965 (e.g., an IR image detector circuit) is associated with higher digital count values and higher temperatures.

The readout circuit 970 may be utilized as an interface between the image detector circuit 965 that detects the image data and the processing component 905 that processes the detected image data as read out by the readout circuit 970, with communication of data from the readout circuit 970 to the processing component 905 facilitated by the image interface 920. An image capturing frame rate may refer to the rate (e.g., images per second) at which images are detected in a sequence by the image detector circuit 965 and provided to the processing component 905 by the readout circuit 970. The readout circuit 970 may read out the pixel values generated by the image detector circuit 965 in accordance with an integration time (e.g., also referred to as an integration period).

In various embodiments, a combination of the image detector circuit 965 and the readout circuit 970 may be, may include, or may together provide an FPA. In some aspects, the image detector circuit 965 may be a thermal image detector circuit that includes an array of microbolometers, and the combination of the image detector circuit 965 and the readout circuit 970 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 915 may include one or more filters adapted to pass radiation of some wavelengths but substantially block radiation of other wavelengths. For example, the imaging capture component 915 may be an IR imaging device that includes one or more filters adapted to pass IR radiation of some wavelengths while substantially blocking IR radiation of other wavelengths (e.g., MWIR filters, thermal IR filters, and narrowband filters). In this example, such filters may be utilized to tailor the imaging capture component 915 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 915 may comprise an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 915 may include a complementary metal oxide semiconductor (CMOS) sensor or a charge-coupled device (CCD) sensor that can be found in any consumer camera (e.g., visible light camera).

Other imaging sensors that may be embodied in the image capture component 915 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 915 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

In some implementations, the imaging capture component 915 may include devices that transmit information to the processing component 905 via wired and/or wireless communications. Wireless communications may be utilized in conjunction with wired communications via the connector 115. Non-limiting examples of direct or indirect wireless communications between the imaging capture component 915 and the processing component 905 may include Bluetooth® communications, near-field communications (NFC), infrared communications, cellular communications, Wi-Fi communications, ZigBee® communications, etc.

The image interface 920 may include, in some embodiments, appropriate input ports, connectors, switches, and/or circuitry configured to interface with external devices (e.g., a remote device 950 and/or other devices) to receive images (e.g., digital image data) generated by or otherwise stored at the external devices. The received images or image data may be provided to the processing component 905. In this regard, the received images or image data may be converted into signals or data suitable for processing by the processing component 905. For example, in one embodiment, the image interface 920 may be configured to receive analog video data and convert it into suitable digital data to be provided to the processing component 905.

In some embodiments, the image interface 920 may include various standard video ports, which may be connected to a video player, a video camera, or other devices capable of generating standard video signals, and may convert the received video signals into digital video/image data suitable for processing by the processing component 905. In some embodiments, the image interface 920 may also be configured to interface with and receive images (e.g., image data) from the image capture component 915. In other embodiments, the image capture component 915 may interface directly with the processing component 905.

The control component 925 includes, in one embodiment, a user input and/or an interface device, such as a rotatable knob (e.g., potentiometer), push buttons, slide bar, keyboard, and/or other devices, that is adapted to generate a user input control signal. The processing component 905 may be configured to sense control input signals from a user via the control component 925 and respond to any sensed control input signals received therefrom. The processing component 905 may be configured to interpret such a control input signal as a value, as generally understood by one skilled in the art. In one embodiment, the control component 925 may include a control unit (e.g., a wired or wireless handheld control unit) having push buttons adapted to interface with a user and receive user input control values. In one implementation, the push buttons of the control unit may be used to control various functions of the imaging system 900, such as autofocus, menu enable and selection, field of view, brightness, contrast, noise filtering, image enhancement, and/or various other features of an imaging system or camera.

The display component 930 includes, in one embodiment, an image display device (e.g., a liquid crystal display (LCD)) or various other types of generally known video displays or monitors. The processing component 905 may be configured to display image data and information on the display component 930. The processing component 905 may be configured to retrieve image data and information from the memory component 910 and display any retrieved image data and information on the display component 930. The display component 930 may include display circuitry, which may be utilized by the processing component 905 to display image data and information. The display component 930 may be adapted to receive image data and information directly from the image capture component 915, processing component 905, and/or image interface 920, or the image data and information may be transferred from the memory component 910 via the processing component 905.

The sensing component 935 includes, in one embodiment, one or more sensors of various types, depending on the application or implementation requirements, as would be understood by one skilled in the art. Sensors of the sensing component 935 provide data and/or information to at least the processing component 105. In one aspect, the processing component 105 may be configured to communicate with the sensing component 935. In various implementations, the sensing component 935 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 935 may represent conventional sensors as generally known by one skilled in the art for monitoring various conditions (e.g., environmental conditions) that may have an effect (e.g., on the image appearance) on the image data provided by the image capture component 915.

In some implementations, the sensing component 935 (e.g., one or more sensors) may include devices that relay information to the processing component 905 via wired and/or wireless communication. For example, the sensing component 935 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 935 to modify a configuration of the image capture component 915 (e.g., adjusting a light sensitivity level, adjusting a direction or angle of the image capture component 915, adjusting an aperture, etc.).

In some embodiments, various components of the imaging system 900 may be distributed and in communication with one another over a network 955. In this regard, the imaging system 900 may include a network interface 940 configured to facilitate wired and/or wireless communication among various components of the imaging system 900 over the network 955. In such embodiments, components may also be replicated if desired for particular applications of the imaging system 900. That is, components configured for same or similar operations may be distributed over a network. Further, all or part of any one of the various components may be implemented using appropriate components of the remote device 950 (e.g., a conventional digital video recorder (DVR), a computer configured for image processing, and/or other device) in communication with various components of the imaging system 900 via the network interface 940 over the network 955, if desired. Thus, for example, all or part of the processing component 905, all or part of the memory component 910, and/or all of part of the display component 930 may be implemented or replicated at the remote device 950. In some embodiments, the imaging system 900 may not include imaging sensors (e.g., image capture component 915), but instead receive images or image data from imaging sensors located separately and remotely from the processing component 905 and/or other components of the imaging system 900. It will be appreciated that many other combinations of distributed implementations of the imaging system 900 are possible, without departing from the scope and spirit of the disclosure.

Furthermore, in various embodiments, various components of the imaging system 900 may be combined and/or implemented or not, as desired or depending on the application or requirements. In one example, the processing component 905 may be combined with the memory component 910, image capture component 915, image interface 920, display component 930, sensing component 935, and/or network interface 940. In another example, the processing component 905 may be combined with the image capture component 915, such that certain functions of processing component 905 are performed by circuitry (e.g., a processor, a microprocessor, a logic device, a microcontroller, etc.) within the image capture component 915.

The imaging system 900 may include other components 975. The other components 975 may include, in some cases, cooling fins to provide cooling of internal components of the device attachment 100 and/or the device 200. As an example, cooling fins may be positioned on an exterior side surface of the attachment body 105 in proximity to internal components (e.g., processing components, memory components).

The other components 975 may include one or more batteries disposed, for example, within the attachment body 105. The battery(ies) may be used as a power source for internal components of the device attachment 100, so that the device attachment 100 does not drain a battery(ies) of the device 200 when the device attachment 100 is coupled to the device 200. In some cases, the battery(ies) of the device attachment 100 may be configured to provide electrical power to the device 200, for example, through the connector 115. Thus, the battery(ies) of the device attachment 100 may provide a source of backup power for the device 200 from which to run and charge. Conversely, various components of the device attachment 100 may be configured to use electrical power from the battery(ies) of the device 200 (e.g., through the connector 115), such as if the user desires to use functionalities of the device attachment 100 even when the battery(ies) of the device attachment 100 is drained. By way of non-limiting examples, a battery of the device attachment 100 may be a rechargeable battery using a suitable technology (e.g., nickel cadmium (NiCd), nickel metal hydride (NiMH), lithium ion (Li-ion), or lithium ion polymer (LiPo) rechargeable batteries. In some cases, the device attachment 100 may include a power socket for connecting to (e.g., through a cable or wire) and receiving electrical power from an external power source (e.g., AC power outlet, DC power adapter, or other similar appropriate power sources) for charging its battery(ies) and/or powering components (e.g., imaging capturing components, processing components, memory components, etc.) of the device attachment 100.

Figure 10:
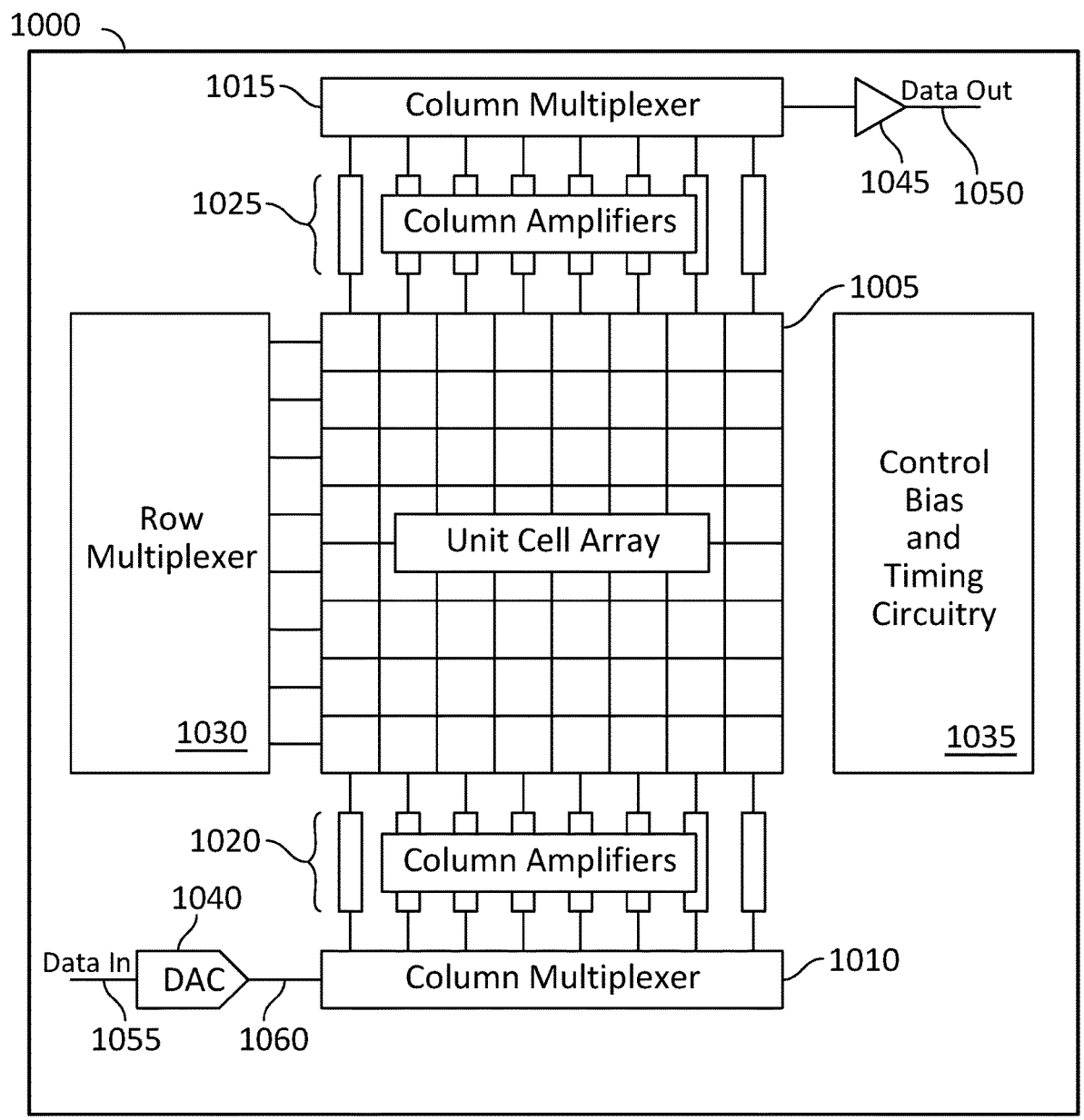
FIG. 10 illustrates a block diagram of an example image sensor assembly in accordance with one or more embodiments of the present disclosure.

FIG. 10 illustrates a block diagram of an example image sensor assembly 1000 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 1000 may be an FPA, for example, implemented as the imaging capture component 915 of FIG. 9.

The image sensor assembly 1000 includes a unit cell array 1005, column multiplexers 1010 and 1015, column amplifiers 1020 and 1025, a row multiplexer 1030, control bias and timing circuitry 1035, a digital-to-analog converter (DAC) 1040, and a data output buffer 1045. The unit cell array 1005 includes an array of unit cells. In an aspect, each unit cell may include a detector (e.g., a pixel) and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 1015, column amplifiers 1020, row multiplexer 1030, and data output buffer 1045 may be used to provide the output signals from the unit cell array 1005 as a data output signal on a data output line 1050. The output signals on the data output line 1050 may be provided to components downstream of the image sensor assembly 1000, such as processing circuitry (e.g., the processing component 905 of FIG. 9), memory (e.g., the memory component 910 of FIG. 9), display device (e.g., the display component 930 of FIG. 9), and/or other component to facilitate processing, storage, and/or display of the output signals. The data output signal may be an image formed of the pixel values for the image sensor assembly 1000. In this regard, the column multiplexer 1015, the column amplifiers 1020, the row multiplexer 1030, and the data output buffer 1045 may collectively provide an ROIC (or portion thereof) of the image sensor assembly 1000. In an embodiment, components of the image sensor assembly 1000 may be implemented such that the unit cell array 1005 is hybridized to (e.g., bonded to, joined to, mated to) the ROIC.

The column amplifiers 1025 may generally represent any column processing circuitry as appropriate for a given application (analog and/or digital), and is not limited to amplifier circuitry for analog signals. In this regard, the column amplifiers 1025 may more generally be referred to as column processors in such an aspect. Signals received by the column amplifiers 1025, such as analog signals on an analog bus and/or digital signals on a digital bus, may be processed according to the analog or digital nature of the signal. As an example, the column amplifiers 1025 may include circuitry for processing digital signals. As another example, the column amplifiers 1025 may be a path (e.g., no processing) through which digital signals from the unit cell array 1005 traverses to get to the column multiplexer 1015. As another example, the column amplifiers 1025 may include an ADC for converting analog signals to digital signals (e.g., to obtain digital count values). These digital signals may be provided to the column multiplexer 1015.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 1035 may generate the bias signals and provide them to the unit cells. By providing appropriate bias signals to each unit cell, the unit cell array 1005 may be effectively calibrated to provide accurate image data in response to light (e.g., IR light) incident on the detectors of the unit cells.

In an aspect, the control bias and timing circuitry 1035 may generate bias values, timing control voltages, and switch control voltages. In some cases, the DAC 1040 may convert the bias values received as, or as part of, data input signal on a data input signal line 1055 into bias signals (e.g., analog signals on analog signal line(s) 1060) that may be provided to individual unit cells through the operation of the column multiplexer 1010, column amplifiers 1020, and row multiplexer 1030. In another aspect, the control bias and timing circuitry 1035 may generate the bias signals (e.g., analog signals) and provide the bias signals to the unit cells without utilizing the DAC 1040. In this regard, some implementations do not include the DAC 1040, data input signal line 1055, and/or analog signal line(s) 1060. In an embodiment, the control bias and timing circuitry 1035 may be, may include, may be a part of, or may otherwise be coupled to the processing component 905 and/or imaging capture component 915 of FIG. 9.

In an embodiment, the image sensor assembly 1000 may be implemented as part of an imaging system (e.g., 900). In addition to the various components of the image sensor assembly 1000, the imaging system may also include one or more processors, memories, logic, displays, interfaces, optics (e.g., lenses, mirrors, beamsplitters), and/or other components as may be appropriate in various implementations. In an aspect, the data output signal on the data output line 1050 may be provided to the processors (not shown) for further processing. For example, the data output signal may be an image formed of the pixel values from the unit cells of the image sensor assembly 1000. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 1005 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 1005 may represent a pixel.

Figure 11:
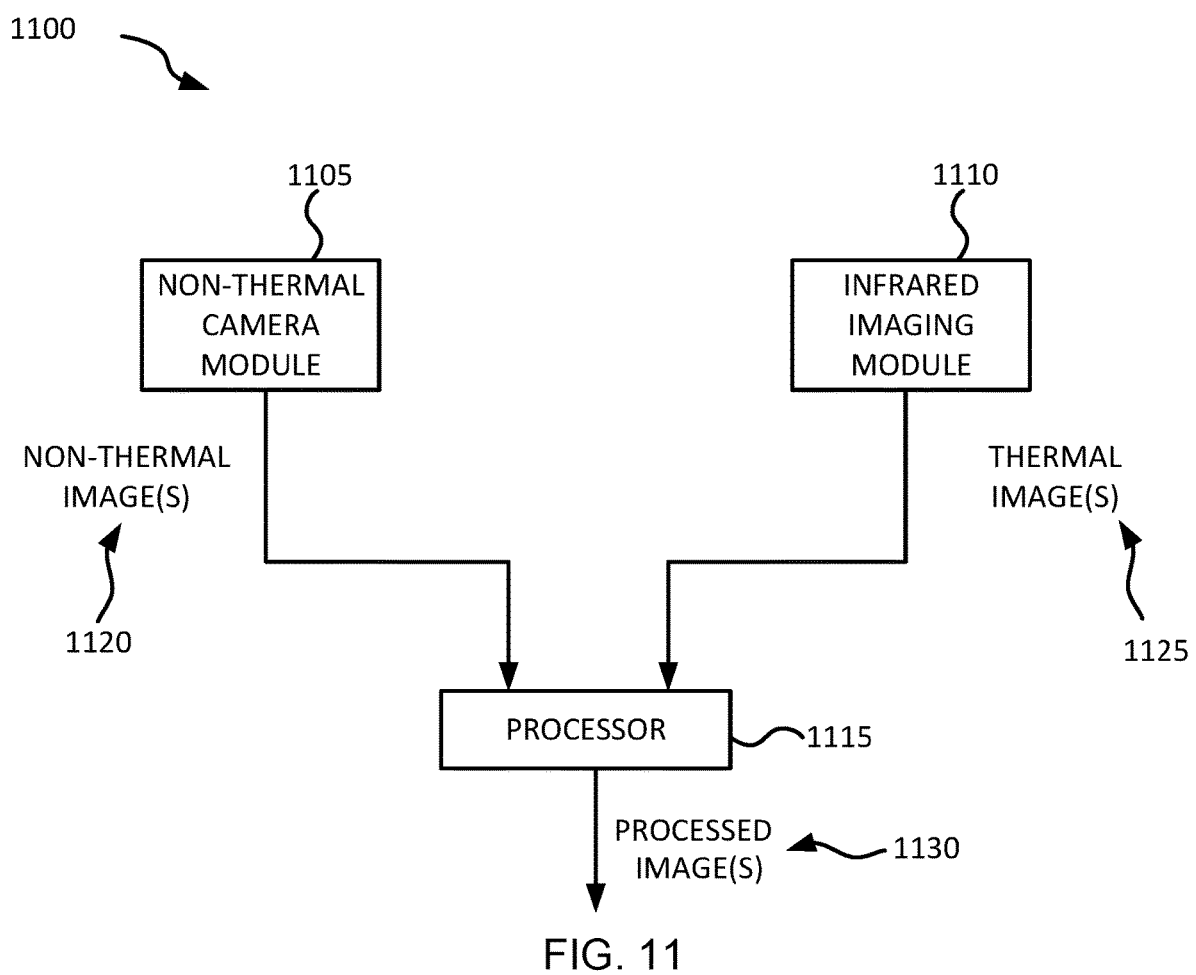
FIGS. 11 and 12 illustrate example systems in which thermal and non-thermal images are combined.

In various embodiments, a device attachment may provide imaging capability/functionality that supplements imaging capability/functionality of a device to which the device attachment is coupled. FIG. 11 shows an example system 1100 in which thermal and non-thermal images are combined. The system 1100 includes a non-thermal camera module 1105, an infrared imaging module 1110, and a processor 1115. The processor 1115 may be implemented using a processor of the device 200 and/or a processor (if any) of the device attachment 100. In this regard, in various embodiments, the processor 1115 may be a processor associated with the device attachment 100 or a processor associated with the device 200, or the processor 1115 may represent combined processing capabilities of the device attachment 100 and the device 200. In some embodiments, the infrared imaging module 1110 and the processor 1115 may be, may include, or may be a part of, the imaging capture component 915 and the processing component 905, respectively, of FIG. 9.

The non-thermal camera module 1105 captures non-thermal images 1120. The infrared imaging module 1110 captures thermal images 1125. The non-thermal camera module 1105 may be implemented using one or more sensors responsive to non-thermal radiation (e.g., radiation in the visible, near infrared, short-wave infrared, or other non-thermal portion of the electromagnetic spectrum). For example, in some embodiments, the non-thermal camera module 1105 may be implemented with a CCD sensor, an electron multiplying CCD (EMCCD) sensor, a CMOS sensor, a scientific CMOS (sCMOS) sensor, an intensified CCD (ICCD), and/or other sensors.

One or more of the thermal images 1120 and one or more of the non-thermal images 1120 may be provided to the processor 1115. The processor 1115 may fuse, superimpose, or otherwise combine the non-thermal images 1120 with the thermal images 1125 to form processed images 1130. The processed images 1130 may be, by way of non-limiting examples, provided to a display of the device 200 and/or the device attachment 100, stored in memory of the device 200 and/or device attachment 100, and/or transmitted to external equipment.

Figure 12:
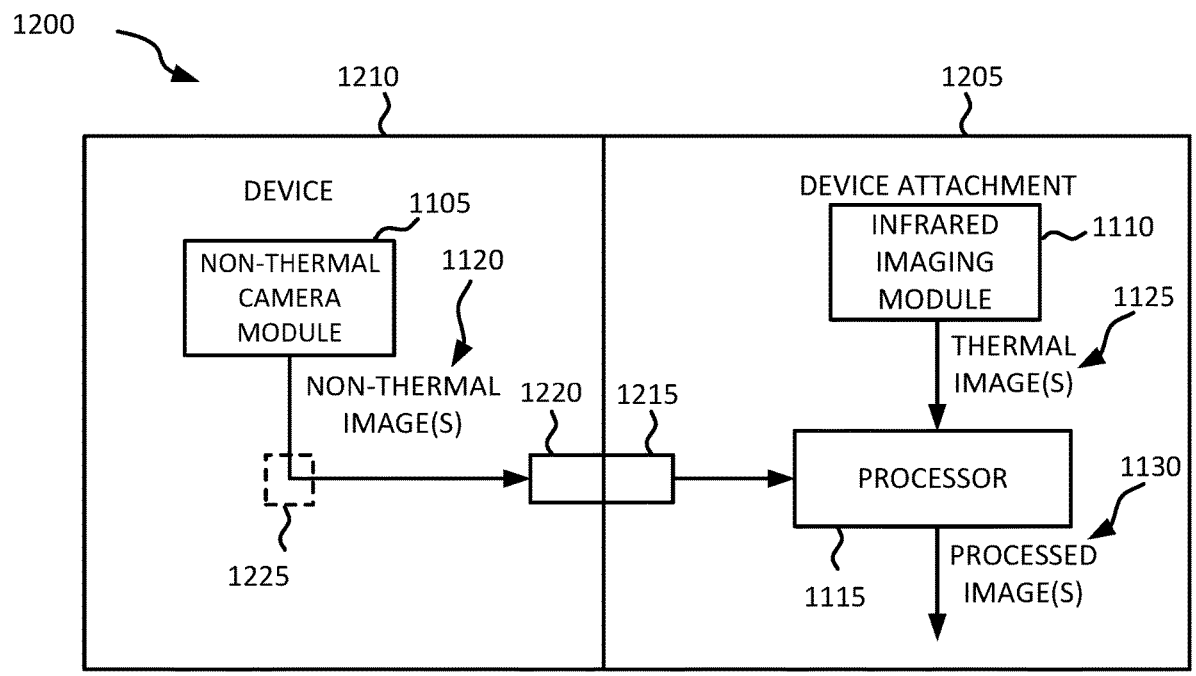

FIG. 12 shows an example system 1200 in which thermal and non-thermal images are combined. The system 1200 includes a device attachment 1205 coupled to a device 1210. In some embodiments, the device attachment 1205 and the device 1210 may be, may include, or may be a part of, the device attachment 100 and the device 200, respectively. In FIG. 12, the processor 1115 of FIG. 11 is implemented in the device attachment 1205. In other embodiments, the processor 1115 of FIG. 11 may be implemented in the device 1210 or collectively by both the device attachment 1205 and the device 1210.

As shown in FIG. 12, as an example, the device attachment 1205 includes the infrared imaging module 1110 and the device 1210 includes the non-thermal camera module 1105. The non-thermal images 1120 are captured using the non-thermal camera module 1105 of the device 1210 and provided to the processor 1115 wirelessly or through connectors 1215 and 1220. In an embodiment, the connector 1215 may be the connector 115 and the connector 1220 may be a mating connector/port for receiving the connector 1215. In this embodiment, the thermal images 1125 are also provided to the processor 1115 from the infrared imaging module 1110 to be combined with the non-thermal images 1120 to form the processed images 1130. If desired, the non-thermal images 1120 may undergo some processing using a processor 1225 before being provided to the processor 1115. In this embodiment, the processed images 1130 may be provided back to the processor 1225 to be stored, displayed, or otherwise handled by the processor 1225.

Figure 13:
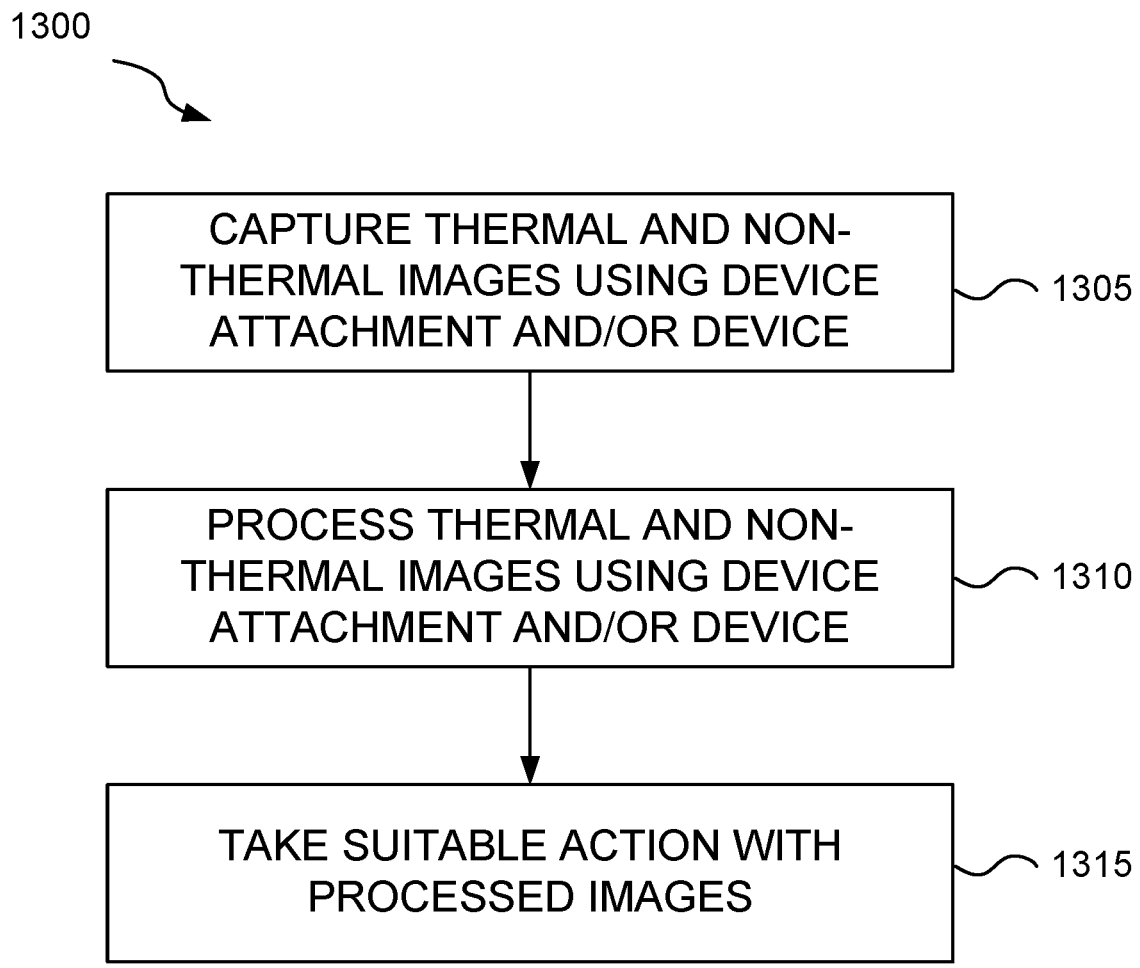
FIG. 13 illustrates a flow diagram of an example process for capturing and combining thermal and non-thermal images using a device and a device attachment in accordance with one or more embodiments of the present disclosure.

FIG. 13 illustrates a flow diagram of an example process 1300 for capturing and combining thermal and non-thermal images using a device and a device attachment in accordance with one or more embodiments of the present disclosure. Although the process 1300 is described with reference to the system 1100 of FIG. 11, the process 1300 may be performed for other systems that include device attachments and devices.

At block 1305, the thermal images 1125 and the non-thermal images 1120 are captured using the infrared imaging module 1110 (e.g., in the device attachment 100) and the non-thermal camera module 1105 (e.g., in the device 200), respectively. At block 1310, the processor 1115 (e.g., implemented in the device attachment 100 and/or the device 200) processes the thermal images 1125 and the non-thermal images 1120 captured at block 1305 to obtain the processed images 1130. In some cases, the thermal images 1125 and the non-thermal images 1120 may undergo individual processing operations and/or processing operations for combining, fusing, or superimposing the images. As one example, processing of the thermal images 1125 and the non-thermal images 1120 may include parallax corrections based on a distance between the non-thermal camera module 1105 and the infrared imaging module 1110 used to capture the images. As another example, processing the thermal images 1125 may include performing various image correction operations such as a non-uniformity correction (NUC) process. At block 1315, suitable action may be taken with the processed images 1130. Suitable action may be performed by the device attachment 100 and/or the device 200. Suitable action may include displaying the processed images 1130 (e.g., using a display of the device attachment 100 (if any) and/or the device 200), storing the processed images 1130 (e.g., on the device attachment 100 and/or on the device 200), and/or transmitting the processed images 1130 (e.g., between the device attachment 100 and the device 200 and/or to external equipment).

Terms such as "top", "bottom", "front", "rear", "side", "horizontal", "vertical", and the like refer to an arbitrary frame of reference, rather than to the ordinary gravitational frame of reference. Thus, such a term may extend upwardly, downwardly, diagonally, or horizontally in a gravitational frame of reference.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A sensor device comprising:
   an attachment body configured to be disposed along a first side of a user device when the sensor device is coupled to the user device;
   a contact layer disposed on the attachment body, wherein the contact layer is configured to contact and apply a force against the first side of the user device to at least partially secure the sensor device to the user device;
   a first actuator configured to selectively apply a first force;
   a connector block coupled to the first actuator and configured to selectively extend from or retract into the attachment body in response to the first force such that a distance between a first side of the attachment body facing the first side of the user device and a side of the connector block is adjustable and based on the first force; and
   a connector configured to:
     couple to a connector port of the user device and apply a force against a second side of the user device different from the first side of the user device to at least partially secure the sensor device to the user device, wherein, when the sensor device is attached to the user device, the sensor device is configured to only contact two sides of the user device; and
     provide data communication between the sensor device and the user device, wherein the connector is at least partially disposed in the connector block.

2. The sensor device of claim 1, further comprising a sensor disposed on a second side of the attachment body, and wherein the second side of the attachment body is opposite the first side that faces the first side of the user device.

3. The sensor device of claim 1, further comprising an infrared sensor assembly within the attachment body, wherein the infrared sensor assembly is configured to capture infrared image data associated with a scene.

4. The sensor device of claim 3, further comprising:
   a metal sheet disposed on the attachment body, wherein the contact layer is disposed on the metal sheet; and
   a processor communicatively coupled to the infrared sensor assembly and configured to provide information associated with the infrared image data through the connector to the user device, wherein the connector is configured to selectively retract into or extend from the connector block.

5. The sensor device of claim 1, wherein the first actuator is configured to apply the first force on the connector block to extend the connector block when a second force is applied on the first actuator, and wherein the contact layer comprises a layer of rubber.

6. The sensor device of claim 5, further comprises a second actuator configured to apply a third force to cause the connector block to retract, wherein the second actuator is disposed partially on and/or within the attachment body.

7. The sensor device of claim 6, wherein the third force is applied when the second force is removed from the first actuator.

8. The sensor device of claim 7, wherein the first actuator comprises at least one button disposed on and/or within the attachment body, and wherein the second actuator comprises at least one spring.

9. The sensor device of claim 1, wherein the first actuator is configured to selectively apply the first force in response to a rotation of the first actuator.

10. The sensor device of claim 9, wherein the first actuator comprises a screw or a bolt.

11. A method comprising:
    applying a first force on a connector block of a sensor device to extend the connector block, wherein the connector block is disposed at least partially within an attachment body of the sensor device, and wherein a distance between a first side of the attachment body and a side of the connector block is adjustable and based on the first force;
    coupling to a user device the sensor device using a connector of the sensor device, wherein a first side of the user device faces the first side of the attachment body, wherein the connector is at least partially disposed in the connector block;
    contacting a contact layer of the sensor device to the first side of the user device, wherein the contact layer is disposed on the attachment body, and wherein the first side of the attachment body faces the first side of the user device upon the contacting;
    applying, by the contact layer of the sensor device, a second force against the first side of the user device to at least partially secure the sensor device to the user device;
    applying, by the connector, a third force against a second side of the user device different from the first side of the user device to at least partially secure the sensor device to the user device;
    capturing, by the sensor device, sensor data; and
    providing, by the sensor device, information associated with the sensor data to the user device through the connector, wherein, when the sensor device is attached to the user device, the sensor device only contacts the user device at the first side of the user device and the second side of the user device.

12. The method of claim 11, further comprising retracting at least a portion of the first force on the connector block to retract the connector block, wherein the retracting occurs until the sensor device contacts the first side of the user device.

13. The method of claim 12, further comprising:
rotating an actuator in a first angular direction, wherein the actuator applies the first force in response to the rotating in the first angular direction; and
rotating the actuator in a second angular direction different from the first angular direction, wherein the actuator retracts the portion of the first force in response to the rotating in the second angular direction.

14. The method of claim 11, further comprising uncoupling the sensor device from the user device, wherein the connector block extends and retracts along a direction perpendicular to a plane defined by the first side of the attachment body, and wherein the distance is any value in a range between a minimum distance and a maximum distance.

15. The method of claim 11, further comprising applying a fourth force to an actuator of the sensor device, wherein the first force is applied in response to the fourth force applied to the actuator, and wherein the distance is one of a plurality of predetermined distances between a minimum distance and a maximum distance.

16. The method of claim 15, wherein a portion of the first force is retracted in response to a decrease in the fourth force applied to the actuator.

17. The method of claim 11, wherein the sensor data comprises infrared image data, and wherein the method further comprises processing, by the user device, the information from the sensor device.

18. The method of claim 11, wherein the user device is coupled to the sensor device when a protective case is around the user device.

* * * * *

UNITED STATES PATENT AND TRADEMARK OFFICE
CERTIFICATE OF CORRECTION

PATENT NO. : 11,775,049 B2
APPLICATION NO. : 16/998939
DATED : October 3, 2023
INVENTOR(S) : Anton Hoffman and Christian Högstedt It is certified that error appears in the above-identified patent and that said Letters Patent is hereby corrected as shown below:

In the Specification

Column 8, Line 9, change "to perform the coupling (e.g., $D_3 \geq D_1$, in other cases" to -- perform the coupling (e.g., $D_3 \geq D_1$), in other cases --.

Column 8, Line 11, change "to perform the coupling (e.g., $D_3 < D_1$." -- to perform the coupling (e.g.,$D_3 < D_1$). --.

Signed and Sealed this
Fourteenth Day of November, 2023

Katherine Kelly Vidal
*Director of the United States Patent and Trademark Office*